United States Patent [19]

Konishi et al.

[11] Patent Number: 5,070,988
[45] Date of Patent: Dec. 10, 1991

[54] APPARATUS FOR ALIGNING ELECTRONIC COMPONENT CHIPS

[75] Inventors: Toru Konishi; Yoshinori Oyabu, both of Kyoto, Japan

[73] Assignee: Murata Manufacturing Co., Ltd., Japan

[21] Appl. No.: 625,877

[22] Filed: Dec. 11, 1990

[30] Foreign Application Priority Data

Dec. 16, 1989 [JP] Japan ................................ 1-326988

[51] Int. Cl.$^5$ ............................................ B65G 47/24
[52] U.S. Cl. .................................. 198/380; 193/2 B; 193/45; 198/533
[58] Field of Search ...................... 198/380, 390, 533; 193/2 B, 45

[56] References Cited

U.S. PATENT DOCUMENTS 2,904,162  9/1959  Simer ................................. 198/380
3,298,491  1/1967  Quest et al. ..................... 198/380 X

FOREIGN PATENT DOCUMENTS 2226547  7/1990  United Kingdom ................ 198/390

Primary Examiner—D. Glenn Dayoan
Assistant Examiner—Keith L. Dixon
Attorney, Agent, or Firm—Ostrolenk, Faber, Gerb & Soffen

[57] ABSTRACT

An apparatus for aligning electronic component chips includes an aligning passage for guiding a plurality of electronic component chips which are in an aligned state along a prescribed direction, and a chamber communicated with the aligning passage for storing the plurality of electronic component chips. A blowing passage is provided near an inlet of the aligning passage for introducing compressed air from the outside. An upper wall surface defining the space is provided by a displaceable movable block, the displacement of the movable block upward is driven by the compressed air introduced from the blowing passage, and displacement downward is driven by natural gravity. Therefore, by the intermittent introduction of the compressed air, the movable block reciprocates up and down so that a space between the upper and lower wall surfaces of the space is widened and narrowed. Consequently, a phenomenon in which a plurality of electronic component chips butt to each other between these wall surfaces to stop the movement of the electronic component chips can be easily dissolved.

10 Claims, 6 Drawing Sheets

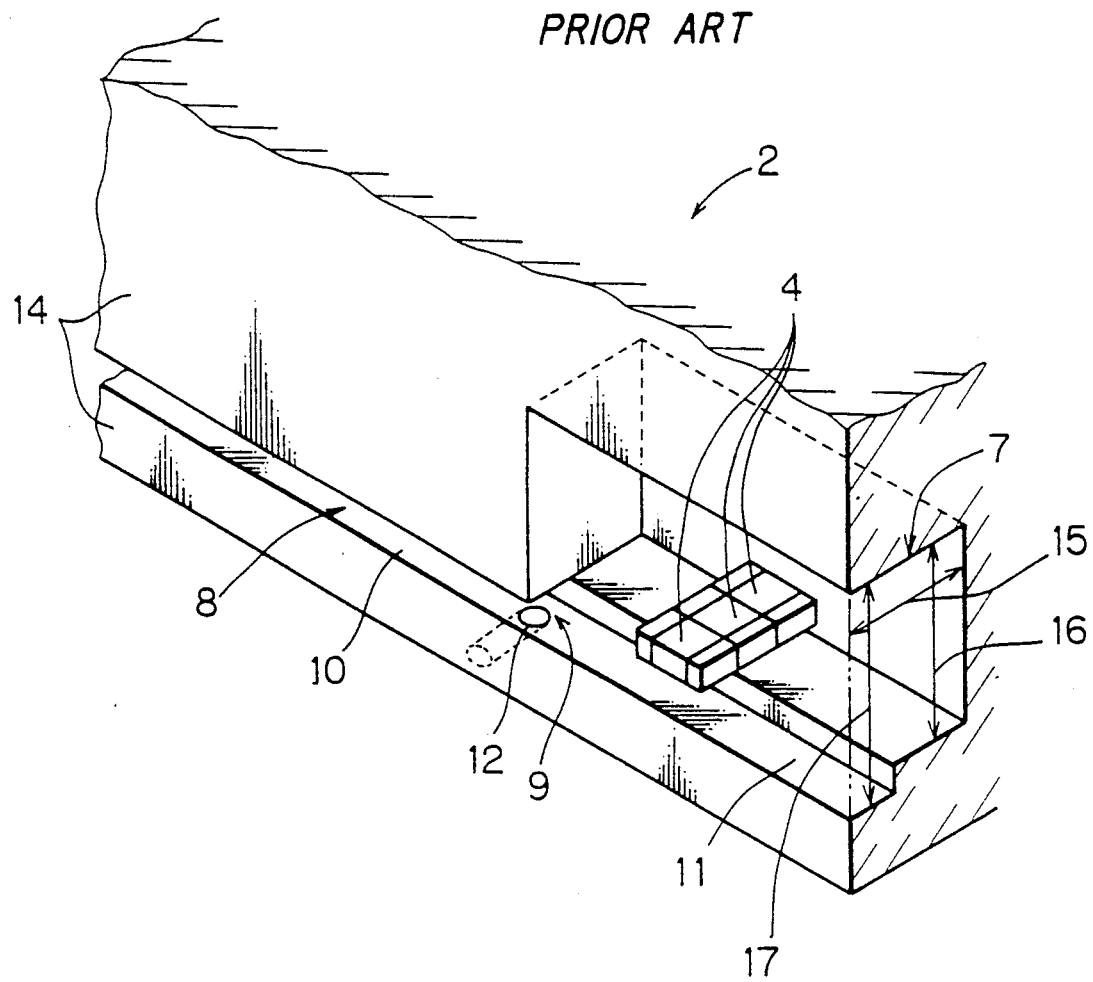

APPARATUS FOR ALIGNING ELECTRONIC COMPONENT CHIPS

BACKGROUND OF THE INVENTION

1. Field of the Invention

The present invention relates to an apparatus for aligning electronic component chips, which is adapted to align along a prescribed direction a plurality of electronic component chips (including electrical parts such as passive and active parts, finished chip components and partially fabricated components). More particularly, it relates to an improvement for smoothing movement of a plurality of electronic component chips within such an apparatus for aligning electronic component chips.

2. Description of the Background Art

A technique for smoothing movement of a plurality of electronic component chips in such an apparatus for aligning electronic component chips as described above has been described in Japanese Patent Application No. 63-335107 and Japanese Patent Application No. 63-335108 (both corresponding to USSN 458897, GB 2226547A and DE 3942996A1) filed by the applicant (assignee) of the present application.

The applicant of the present application has proposed a cassette storing electronic components, which is advantageously employed for supplying electronic component chips to a chip supplying apparatus in Japanese Patent Application No. 62-96925 (corresponding to EP 0288277A2 and USSN 184112).

The aforementioned cassette storing electronic component chips basically comprises a plurality of electronic component chips, a case having an internal storage space for storing the electronic component chips and an outlet communicating with the internal storage space for discharging the electronic component chips, and an openable closure for closing the outlet. An electronic component chip manufacturer can directly use such a cassette storing electronic component chips as a packaging mode which is applicable to transportation of electronic component chips, while a user of electronic component chips can directly mount the cassette on a chip mounting apparatus for supplying a plurality of electronic component chips one by one to a chip mounting station.

FIG. 8 is a sectional view illustrating a chip mounting step carried out through such a cassette 1 storing electronic component chips (which is shown in phantom lines). The cassette 1 is directly mounted on a hopper 2 of a chip mounting apparatus. More specifically, the cassette 1 is fixed to the hopper 2 so that its outlet faces an opening 3 of the hopper 2, and a closure of the cassette 1 is opened to supply a plurality of electronic component chips 4, which have been stored in an internal storage space of the cassette 1, into the hopper 2 from the outlet.

The hopper 2 is generally inclined at an angle 5 of inclination of about 45°, for example. The electronic component chips 4 supplied into the hopper 2 first flow into a large chamber 6 and then enter a small chamber 7, to finally reach an aligning passage 8. This aligning passage 8 is adapted to guide and move the plurality of electronic component chips 4 in a state aligned with each other along a prescribed direction. In order to achieve this function, sectional dimensions of the aligning passage 8 are selected in relation to the sectional dimensions of each electronic component chip 4.

The small chamber 7 is communicated with the aligning passage 8 and is formed in the vicinity of an inlet 9 of the aligning passage 8, defining a space having larger sectional area than that of the aligning passage 8.

FIG. 9 is an enlarged perspective view showing the structure provided between the small chamber 7 and a portion close to the inlet 9 of the aligning passage 8. As understood from FIGS. 9 and 8, the small chamber 7 has one wall surface 11 which is flush with a wall surface 10 defining the inlet 9 of the aligning passage 8. The wall surface 11 extends to the larger chamber 6 providing a bottom surface of a groove.

A blowing passage 12 is provided in a portion near the inlet 9 of the aligning passage 8, in order to introduce compressed air from the exterior in an intermittent manner, for example. The compressed air introduced through the blowing passage 12 blows off and stirs the electronic component chips 4 approaching the inlet 9 of the aligning passage 8.

Thus, the plurality of electronic component chips 4 supplied from the cassette 1 pass through the large chamber 6 and the small chamber 7 to approach the aligning passage 8, and are aligned along a prescribed direction to enter the inlet 9. Then the electronic component chips 4 are guided by the aligning passage 8 and discharged from the outlet 13. The electronic component chips 4 discharged from the outlet 13 are aligned in the prescribed direction. Thus, the chip mounting step can be efficiently carried out by retaining the electronic component chips in the aligned state.

FIG. 9 shows the hopper 2 with a side plate forming a front side wall surface removed. Namely, referring to FIG. 9, actually a side plate, not shown, is positioned along the wall surface denoted by the reference numeral 14, and by this side plate, the small chamber 7, the aligning passage 8 and the large chamber 6 are closed. aligning passage 8 and the large chamber 6 are closed. Therefore, the space in the small chamber 7 has a cross-directional dimension denoted by the reference numeral 15.

FIG. 9 shows three electronic components 4 which are horizontally aligned with each other. The total of the cross-directional sizes of these electronic component chips 4 accidentally coincides with the cross-directional size 15 of the space defined in the small chamber 7. Thus, these electronic component chips 4 unmovably butt against each other between the wall surfaces defining the cross-directional size 15. Once such a phenomenon, that is, the so-called "bridge phenomenon" takes place, it is difficult to separate the electronic component chips 4 which are in such series from each other, even if compressed air is introduced through the blowing passage 12.

The aforementioned "bridge phenomenon" is not restricted to the modes shown in FIG. 9, but may occur in various modes in response to relation between the cross-directional size 15 and the sizes of the electronic component chips 4. In other words, this phenomenon easily takes place when the combination of the longitudinal, cross-directional and perpendicular sizes of the plurality of electronic component chips 4 accidentally corresponds may take place not only in response to the relation with the cross-directional size 15 of the small chamber 7 but also in relations with the perpendicular sizes 16 and 17.

The "bridge phenomenon" is not so frequent but merely occurs in the order of p.p.m. in general. Once the "bridge phenomenon" takes place, however, it is impossible or difficult to supply the electronic component chips 4 to the aligning passage 8. In order to improve workability and reliability of a chip mounting apparatus or the like, therefore, it is desirable to substantially zeroize the probability for the "bridge phenomenon".

SUMMARY OF THE INVENTION

Accordingly, an object of the present invention is to improve an apparatus for aligning electronic component chips, which is represented by the aforementioned hopper, for absolutely or substantially preventing occurrence of a "bridge phenomenon".

The present invention is aimed at an apparatus for aligning electronic component chips including an aligning passage for guiding a plurality of electronic component chips in a state aligned in a prescribed direction, and a chamber communicated with the aligning passage defining a space having larger cross sectional area than that of the aligning passage at an inlet side of the aligning passage for storing the plurality of electronic component chips, having the following structure to solve the above described technical problem.

More specifically, a blowing passage for introducing compressed air from the exterior is provided at the inlet of the aligning passage, and at least one of a plurality of wall surfaces defining the space is provided by a displaceable movable block, with displacement in one direction of the movable block driven by the compressed air introduced from the blowing passage, and displacement in the other direction driven by natural gravity.

According to the present invention, when the compressed air is introduced from the blowing passage, the movable block moves in one direction, and when introduction of the compressed air is stopped, the movable block moves in the other direction. Therefore, if the compressed air is introduced intermittently, for example, from the blowing passage, the movable block reciprocates, making wider or narrower the space between the wall surface of the movable block and opposing wall surface.

Thus, according to the present invention, when the "bridge phenomenon" of the electronic component chips is about to occur in the space between the wall surface of the movable block and the opposing wall surface, the "bridge phenomenon" itself is restrained since the movable block is displaced, and even if the "bridge phenomenon" happens to occur, such phenomenon can be readily dissolved as the space between the wall surfaces is changed.

Therefore, movement of the plurality of electronic component chips in the apparatus for aligning the electronic component chips is made smooth, enabling smooth supply of the electronic component chips through the aligning passage.

Therefore, when the apparatus for aligning the electronic component chips in accordance with the present invention is applied to a chip mounting apparatus, the step of mounting the chips can be done with high efficiency and high reliability.

In the present invention, compressed air introduced from a blowing passage is used for displacing the movable block. The compressed air stirs the electronic component chips near the inlet of the aligning passage to enable more smooth entrance of the electronic component chips to the aligning passage. Therefore, movement of the electronic component chips in the apparatus for aligning the electronic component chips can be made more smooth, and economically the present invention is superior, since the compressed air is used both for stirring the electronic component chips and for driving the movable block. In an apparatus for aligning electronic component chips having the blowing passage for introducing the compressed air, what is necessary to provide the effect of the present invention is only to provide the movable block. Namely, implementation of the present invention does not incur much cost.

Preferably, the movable block is adapted to provide a wall surface defining an upper surface of a space formed in the chamber for containing the plurality of electronic component chips and is made displaceable upward and downward relatively. At this time, the wall surface provided by the movable block is preferably not parallel to the wall surface defining the lower surface of the space.

The chamber may comprise a small chamber formed near the inlet of the aligning passage and a large chamber communicated with the small chamber. In this case, a gate having an opening whose cross section is smaller than that of the small chamber may preferably be provided at the boundary between the small and the large chamber. In addition, the opening formed in the gate may be preferably defined by an inner circumference having roundness.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a perspective view showing, in enlargement the main portion of the hopper 2 shown in FIG. 8, illustring a problem to be solved by the present invention.

DESCRIPTION OF THE PREFERRED EMBODIMENTS

Figure 1:
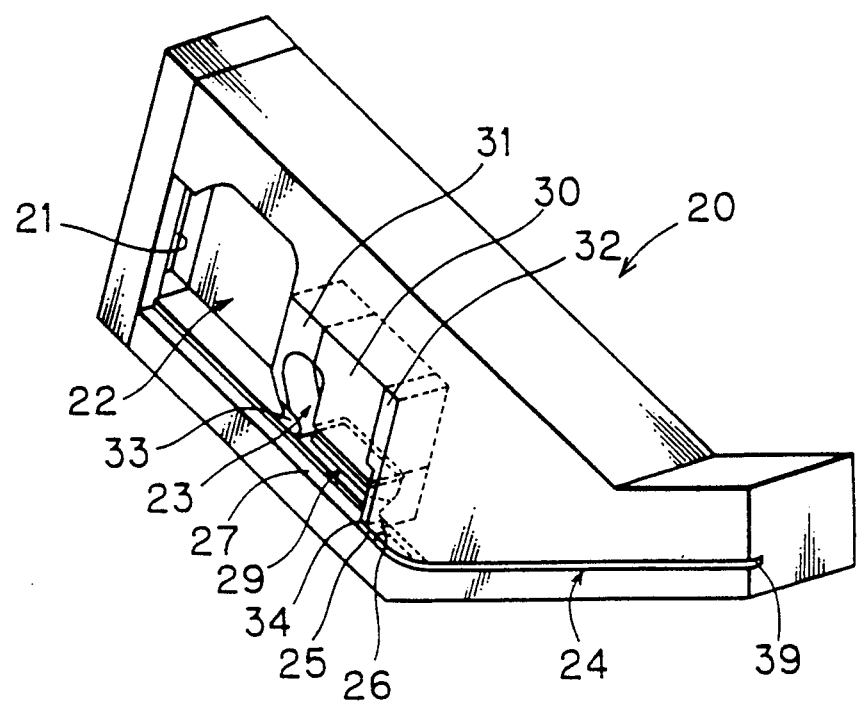
FIG. 1 is a perspective view showing a hopper 20 to which one embodiment of the present invention is applied, with a side plate 37 (FIGS. 3 and 4) in front omitted.
Figure 2:
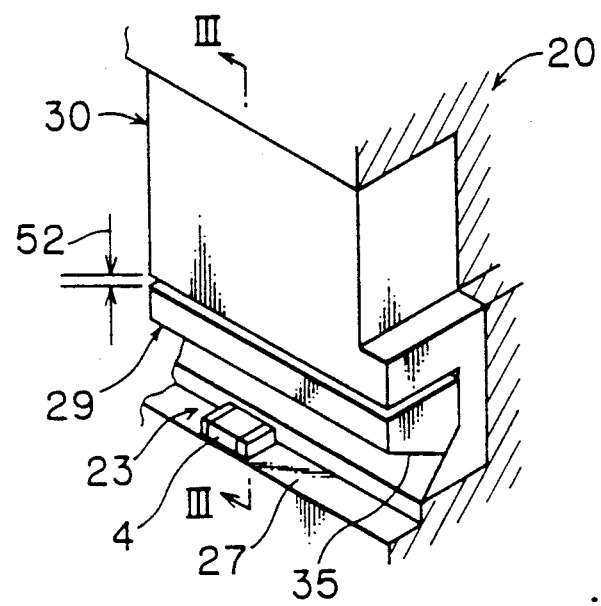
FIG. 2 is a perspective view showing in enlargement a main portion of the hopper 20 shown in FIG. 1.
Figure 3:
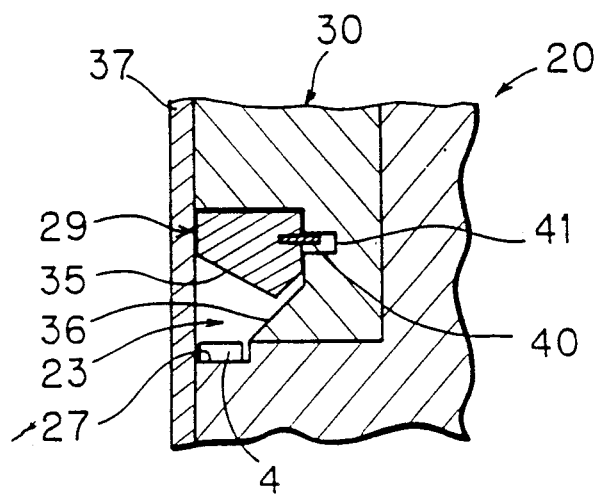
FIG. 3 is a cross sectional view taken along the line III—III of FIG. 2, showing the movable block 29 displaced upward.
Figure 4:
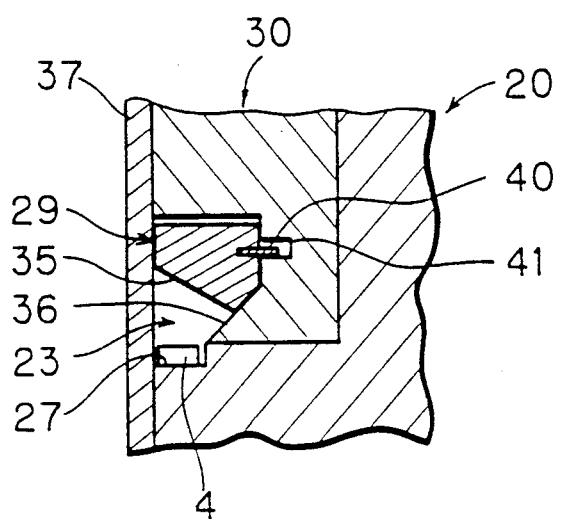
FIG. 4 is also a cross sectional view taken along the line III—III of FIG. 2, showing the movable block 29 displaced downward.
Figure 5:
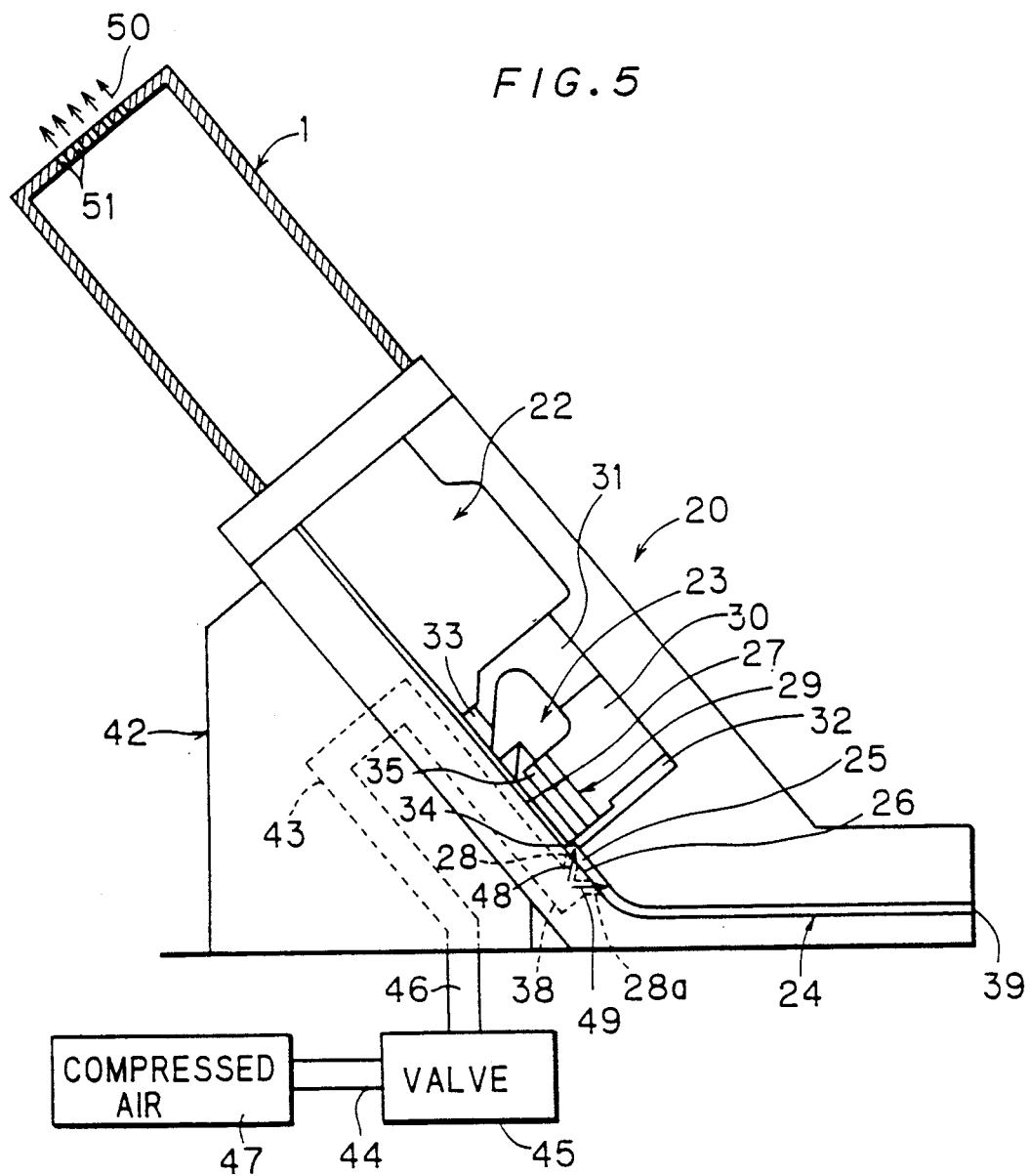
FIG. 5 is a front view showing the step of chip mounting, with a cassette 1 storing electronic component chips attached to the hopper 20 of FIG. 1, in which the side plate 37 (FIGS. 3 and 4) is omitted.

FIGS. 1 to 5 illustrate one embodiment of the present invention. More specifically, FIG. 1 is a perspective view showing a hopper 20 as an apparatus for aligning electronic component chips with a side plate in the front removed. FIG. 2 is a perspective view showing, in enlargement, a main portion of the hopper 20 shown in FIG. 1. FIGS. 3 and 4 are cross sectional views taken along the line III—III of FIG. 2, showing different states of operation. FIG. 5 is a front view showing a state of attachment of the hopper 20 shown in FIG. 1, with the side plate in front removed.

Figure 8:
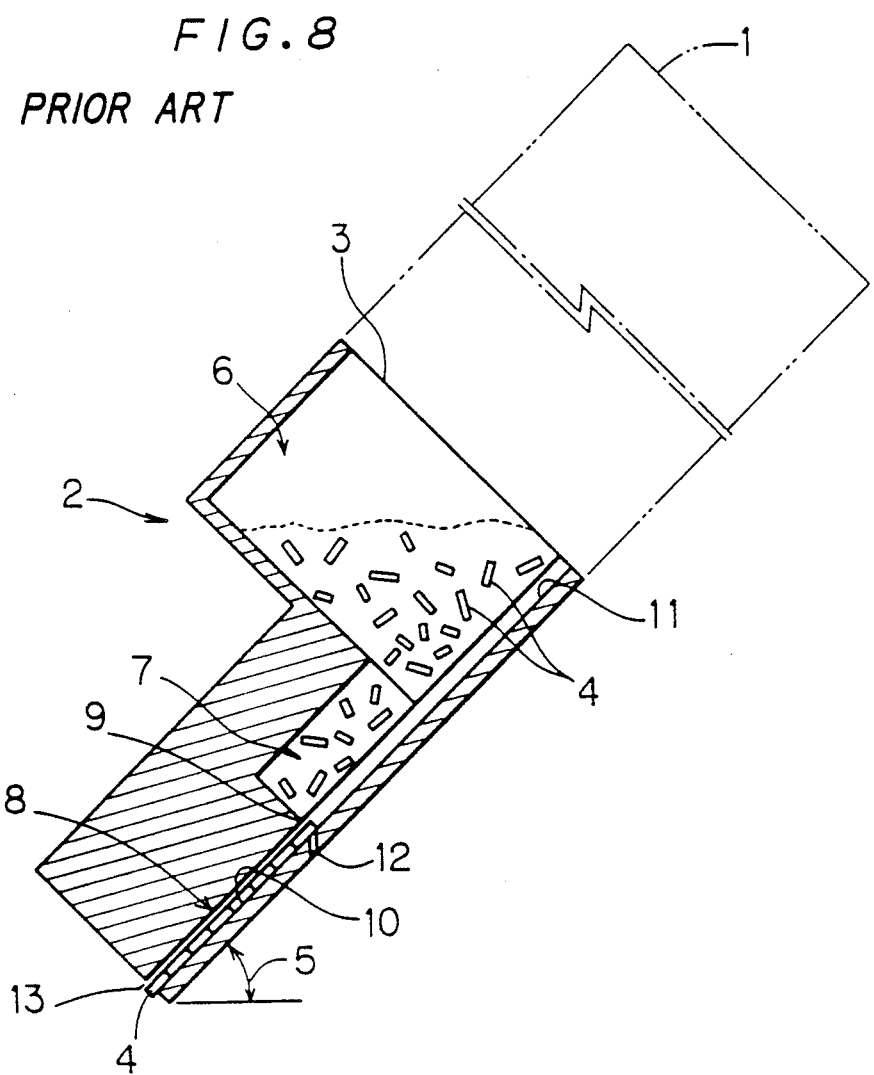
FIG. 8 is a vertical sectional view showing the hopper 2 as an example of the conventional apparatus for aligning electronic component chips.

Referring to FIG. 1, an opening 21 is provided on one end portion of the hopper 20. In order to introduce a plurality of electronic component chips 4 (FIGS. 2 to 4) to the opening 21, a cassette 1 storing electronic component chips is attached to the hopper 20 as shown in FIG. 5. As in the conventional hopper 2 (FIG. 8), the electronic component chips 4 supplied to the hopper 20 first flow to the large chamber 22 and, then to the small chamber 23 and finally reaches the aligning passage 24. The aligning passage 24 serves to guide the plurality of electronic component chips 4 so that they move in a state aligned in a prescribed direction, as does the aligning passage 8 shown in FIG. 8. Although the aligning passage 24 is bent in the present embodiment, it is not an essential characteristic, and it may be straight as the aligning passage 8 shown in FIG. 8.

The small chamber 23 is communicated with the aligning passage 24 and positioned on the side of the inlet 25 of the aligning passage 24. The small chamber 23 defines a space having larger cross sectional area than that of the aligning passage 24. The large chamber 22 defines a space having larger cross sectional area than that of the small chamber 23.

The lower surface 26 near the inlet 25 of the aligning passage 24 is flush with one wall surface 27 defining the space of the small chamber 23. The wall surface 27 extends to the large chamber 22 while providing a bottom surface of the groove.

Referring to FIG. 5, a blowing passage 28, corresponding to the above mentioned blowing passage 12, is provided in the vicinity of the inlet 25 of the aligning passage 24. The blowing passage 28 extends in an inclined direction so as to introduce compressed air from the lower surface 26 of the inlet 25 of the aligning passage 24 to the small chamber 23. The compressed air is supplied to the blowing passage 28 through an air passage 38 provided on the bottom wall of the hopper 20.

A second blowing passage 28a is provided near the blowing passage 28. The compressed air is also supplied to the second blowing passage 28a through the air passage 38. The second blowing passage 28a is inclined in the direction of extension of the aligning passage 24 so as to feed compressed air to the outlet 39 of the aligning passage 24. The compressed air introduced from the second blowing passage 28a serves to move the electronic component chips 4 in the aligning passage 24 more smooth to the outlet 39.

Although not shown, vacuum suction is preferably employed to take out the electronic component chips from the outlet 39 of the aligning passage 24. The electronic component chips 4 taken out by vacuum suction are treated such that the aligned state in the aligning passage 24 is maintained, and then supplied to the succeeding step of mounting, for example.

The characteristic of this embodiment lies in the structure of the small chamber 23. More specifically, some blocks having particular shapes or the structures are inserted to the small chamber 23 so as to more easily provide the preferred structure thereof. One of these blocks is the movable block 29 which is the characteristic of the present invention. The movable block 29 is held displaceable upward and downward by a guide block 30 surrounding the same. The guide block 30 is incorporated in the small chamber 23 between a gate block 31 and a spacer block 32.

The gate block 31 is positioned near the boundary between the large chamber 22 and the small chamber 23. An opening 33 allowing passage of the electronic component chips 4 therethrough is formed in the gate block 31. The gate block 31 serves to prevent jamming of the electronic component chips 4 positioned at relatively lower position, for example positioned in the small chamber 23, by the weight applied from each of a large number of electronic component chips 4 reserved in the hopper 20, and serves to keep constant the weight applied to the electronic component chips 4 especially in the small chamber 23 regardless of the number of the electronic component chips 4 reserved in the hopper 20. The opening 33 formed in the gate block 31 is preferably defined by an inner circumferential surface having roundness.

The spacer block 32 has a notch 34 in a portion thereof. The notch 34 provides a passage having the same cross section as the aligning passage 24 and, as a result, constitutes a portion of the aligning passage 24.

The movable block 29 has an inclined surface 35 on the lower portion thereof. Meanwhile, the guide block 30 has an inclined surface 36 on the lower portion thereof, which extends to intersect the inclined surface 35. The movable block 29 is held displaceable in upward and downward directions, sandwiched between the guide block 30 and the side plate 37 (not shown in FIGS. 1, 2 and 5) as shown in FIGS. 3 and 4.

In order to certainly define the terminal end of displacement in the upward and downward directions of the movable block 29, a positioning projection 40 may be provided on the rear surface of the movable block 29, and a positioning concave portion 41 to receive the positioning projection 40 may be provided in the guide block 30. The positioning concave portion 41 has a dimension allowing the positioning projection 40 to move by a prescribed distance in the up and down directions therein. Therefore, by that distance in which the positioning projection 40 is allowed to move in up and down directions in the positioning concave portion 41, the movable block 29 can be displaced in the upward and downward directions. The fitting of the positioning projection 40 in the positioning concave portion 41 also prevents deviation of the movable block 29 from the prescribed moving path in the upward and downward directions.

Displacement of the movable block 29 in one direction, that is, upward displacement is driven by the compressed air introduced from the blowing passage 28. More specifically, referring to FIG. 5, the hopper 20 is positioned on a support base 42. The support base 42 has a surface in contact with the bottom wall of the hopper 20 and has an air passage 43 communicated with the aforementioned air passage 38. A compressed air supply source 47 is connected to the air passage 43 through a conduit 44, a valve 45 and a conduit 46. The valve 45 is repeatedly opened and closed periodically, for example, and correspondingly the compressed air is intermittently supplied to the conduit 46, the air passages 43 and 38 and to the blowing passages 28 and 28a.

Part of the above described compressed air which is introduced to the blowing passage 28 as shown by an arrow 48 collides the movable block 29, so that the movable block 29 is moved upward as shown in FIG. 3. Meanwhile, if introduction of the compressed air to the blowing passage 28 is stopped, the movable block 29 moves downward as shown in FIG. 4 by the natural gravity. In this manner, as the compressed air is intermittently introduced to the blowing passage 28, the movable block 29 is displaced upward and downward repeatedly, and as a result, the states shown in FIGS. 3 and 4 are repeated alternately.

Therefore, the space between the inclined surface 35 formed on the movable block 29 and the wall surface 27 or the inner surface of the side pate 37 opposing thereto is changed dependent on the displacement of the movable block 29. Therefore, the "bridging phenomenon" of the electronic component chips 4 described above is restrained, and if such a phenomenon is about to occur, it can be dissolved immediately.

The inclined surface 35 formed on the movable block 29 and the inclined surface 36 formed on the guide block 30 themselves serve to prevent occurance of the above described "bridging phenomenon". Namely, the inclined surfaces 35 and 36 do not provide opposing parallel wall surfaces between which the "bridging phenomenon" tends to occur.

Part of the compressed air which is introduced in the direction of an arrow 49 through the second blowing passage 28a flows to the outlet 39 of the aligning passage 24 as shown in FIG. 5, so as to feed the electronic component chips 4 existing in the aligning passage 24 to the outlet 39.

When the cassette 1 storing the electronic component chips is attached to the hopper 20 as shown in FIG. 5 and the space formed by the cassette 1 and the hopper 20 is highly air tight, the compressed air introduced from the blowing passage 28 cannot serve sufficiently. Taking such cases in consideration, air holes 51 for discharging the air as shown by an arrow 50 may preferably be provided in the cassette 1.

Figure 6:
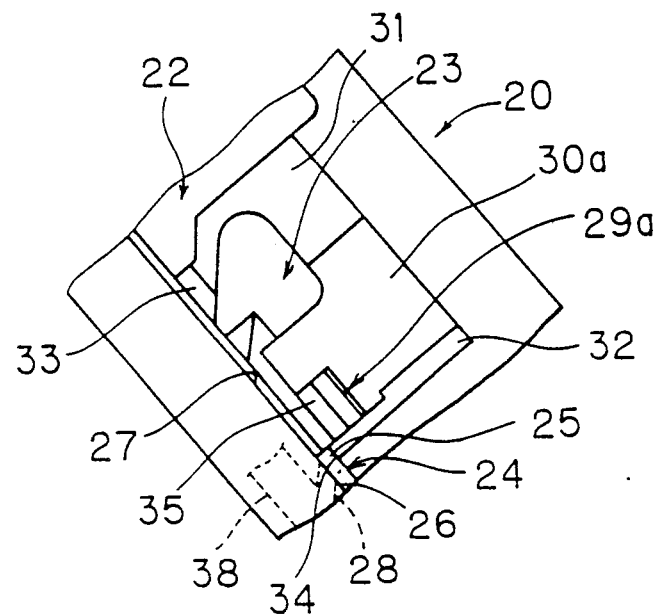
FIG. 6 shows another embodiment of the present invention showing the main portion of the hopper in the same manner as FIG. 5.
Figure 7:
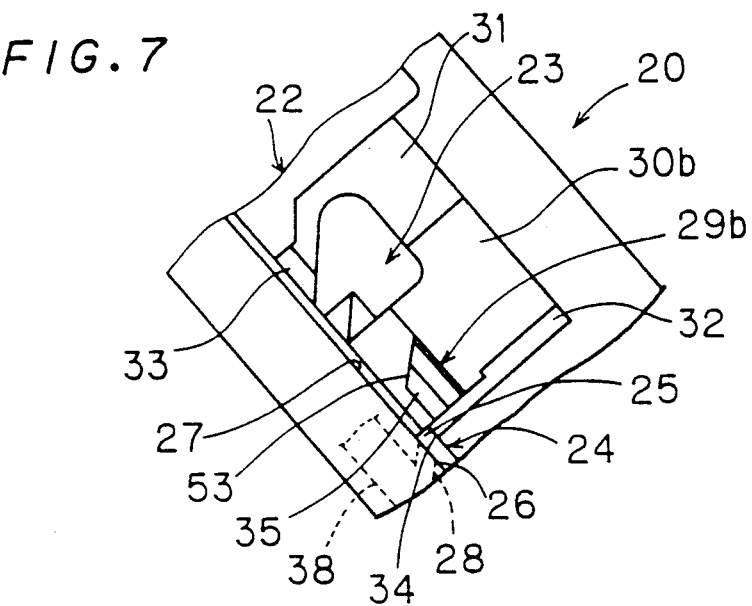
FIG. 7 shows a further embodiment of the present invention, showing the main portion of the hopper 20 in the same manner as FIG. 5.

FIGS. 6 and 7 show other embodiments of the present invention. These figures show the main portion of the hopper 20 in the same manner as FIG. 5.

In these embodiments, the movable portion is provided only at a portion where the bridging phenomenon of the electronic component chips tends to occur, namely, at a limited portion in the vicinity of the inlet of the aligning passage.

In the embodiment shown in FIG. 6, the movable block 29a is shortened in the longitudinal direction compared with the movable block 29 shown in FIG. 5, and it is positioned near the inlet 25 of the aligning passage 24. The guide block 30a has such a shape as to compensate for the shortened size of the movable block 29a. Other structures are the same as those of the hopper 20 shown in FIG. 5, so that the corresponding elements are denoted by the same reference numerals and the description thereof is not repeated.

In the embodiment of FIG. 7, the movable block 29b is shortened in the longitudinal direction as in the embodiment of FIG. 6. The movable block 29b is positioned near the inlet 25 of the aligning passage 24. The movable block 29b is positioned to be projected from one wall surface of the small chamber 23 provided by the guide block 30b. Therefore, an inclined surface 53 should preferably be formed on the surface facing the larger chamber 22 of the movable block 29b. Other structures are the same as those of the hopper 20 shown in FIG. 5, so that the corresponding elements are denoted by the same reference numerals and the description thereof is not repeated.

In the above described embodiments, the apparatus for aligning electronic component chips in accordance with the present invention is applied to the hopper 20 shown in FIGS. 1 to 5. However, if the cassette 1 itself storing the electronic component chips shown in FIG. 5 has an aligning passage, the characteristic structure of the present invention may be applied in relation to a chamber communicated with the aligning passage.

In the above embodiments, a small chamber 23 is provided as a first chamber communicated with the aligning passage 24 and a large chamber 22 exists communicated with the small chamber 23, as shown in FIGS. 1 and 5, as an example. However, it is not necessary to provide separate small and large chambers 23 and 22, and a single chamber may be directly be communicated with the inlet of the aligning passage.

In the embodiments shown, the compressed air is supplied not only to the blowing passage 28 but also to the second blowing passage 28a. However, the second blowing passage 28a is not always necessary.

The movable block 29 may have an arbitrary shape. For example, a surface corresponding to the inclined surface 35 may form a rounded face. Similarly, the inclined surface 36 of the guide block 30 may form a rounded face.

The direction of displacement of the movable block 29 is also arbitrary. More specifically, the movable block may be displaced in any direction provided that the displacement in one direction is driven by the compressed air introduced from the blowing passage and displacement in the other direction is driven by the natural gravity.

The range of displacement of the movable block 29 is also arbitrary. Taking the object of the movable block 29 in consideration, even if the range of displacement is small, it is very effective. For example, in a preferred embodiment, a space 52 (the range of displacement is equal to this or slightly smaller than this) between the movable block and the guide block 30 when the block is displaced downward is as small as about 0.3 mm.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for aligning electronic component chips, comprising:
    an aligning passage for guiding a plurality of electronic component chips to move the chips aligned in a prescribed direction;
    a chamber communicated with said aligning passage and defining a space having a larger cross sectional area than that of said aligning passage on an inlet side of the aligning passage, for storing a plurality of electronic component chips;
    a blowing passage for introducing compressed air from outside being provided near the inlet of said aligning passage, and at least one of a plurality of wall surfaces defining said space being provided by a displaceable movable block, displacement of said movable block in one direction being driven by the compressed air introduced from said blowing passage, displacement in the other direction being driven by natural gravity.

2. An apparatus for aligning electronic component chips according to claim 1, wherein
said movable block provides a wall surface defining an upper surface of said space.

3. An apparatus for aligning electronic component chips according to claim 2, wherein
said wall surface provided by said movable block is not parallel to a wall surface defining a lower surface of said space.

4. An apparatus for aligning electronic component chips according to claim 2, wherein
said blowing passage blows compressed air directed relatively upward in said space.

5. An apparatus for aligning electronic component chips according to claim 4, wherein
said movable block is displaceable in upward and downward directions relatively.

6. An apparatus for aligning electronic component chips according to claim 1, further comprising
means for defining both terminal ends of said displacement of said movable block.

7. An apparatus for aligning electronic component chips according to claim 1, wherein
said blowing passage is inclined with respect to a direction of extension of said aligning passage near the inlet thereof, to blow the compressed air from said aligning passage to said chamber.

8. An apparatus for aligning electronic component chips according to claim 1, further comprising
a second blowing passage for feeding compressed air in a direction from the inlet to the outlet of said aligning passage.

9. An apparatus for aligning electronic component chips according to claim 1, wherein
said chamber includes a small chamber formed near the inlet of said aligning passage and a large chamber communicated with said small chamber.

10. An apparatus for aligning electronic component chips according to claim 9, further comprising
a gate having an opening with a smaller cross sectional area than that of said small chamber, at a boundary between said small chamber and said large chamber.

* * * * *